July 20, 1937.                     C. S. BRAGG                     2,087,370
                          CLUTCH OPERATING MECHANISM
                            Filed Dec. 1, 1932          2 Sheets-Sheet 1

INVENTOR.
CALEB S. BRAGG
BY H. Q. Clayton
ATTORNEY

July 20, 1937.   C. S. BRAGG   2,087,370
CLUTCH OPERATING MECHANISM
Filed Dec. 1, 1932   2 Sheets-Sheet 2
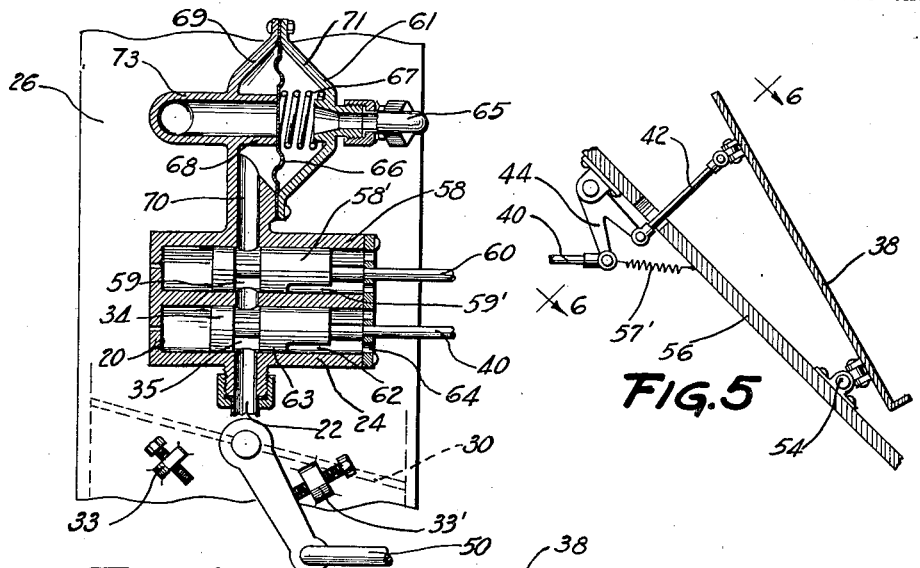
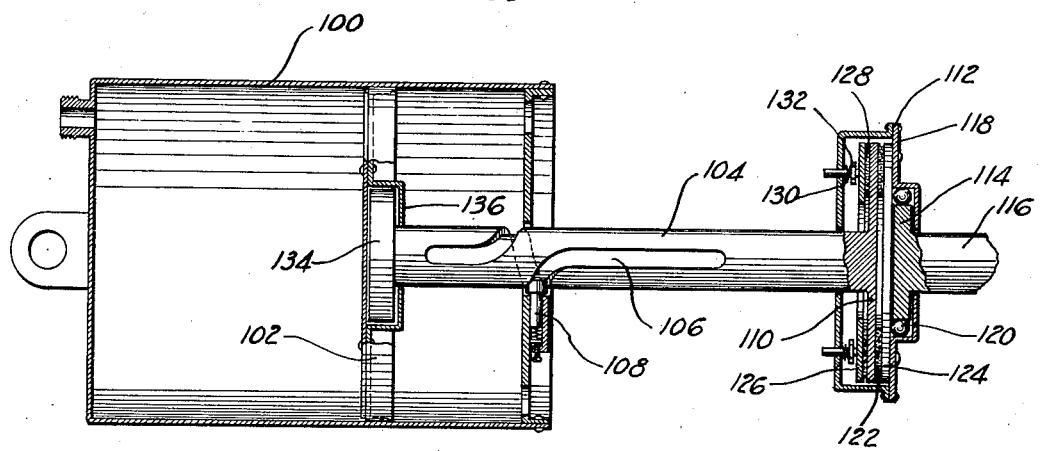
INVENTOR.
CALEB S. BRAGG
BY
ATTORNEY

UNITED STATES PATENT OFFICE 2,087,370

CLUTCH OPERATING MECHANISM

Caleb S. Bragg, Palm Beach, Fla., assignor to Bendix Aviation Corporation, South Bend, Ind., a corporation of Delaware Application December 1, 1932, Serial No. 645,309

14 Claims. (Cl. 192—.01)

This invention relates in general to the power mechanism of an automotive vehicle, and more particularly to the throttle and clutch and their interrelation in controlling the speed of the vehicle.

The invention is designed primarily as an improvement over the clutch and throttle controlled structure disclosed in the United States patent to Belcia, No. 1,470,272, dated October 9, 1923. This patent discloses a vacuum operated power means for disengaging the clutch, the control valve for the power means being operable by the throttle control lever or accelerator pedal; thus when the motor is running, or other source of vacuum is available, and when the accelerator is released preparatory to shifting gears or prior to starting the vehicle in motion, the control valve is rendered operable to energize the vacuum operated motor of the power means and effect a disengagement of the clutch.

The aforementioned patent, however, falls short of providing a throttle and clutch operating mechanism which effectively simulates the conventional coordinated throttle and clutch operation by the two feet of the driver.

The many different conditions encountered in the operation of the vehicle necessitate different coordinated modes of operation of the throttle and clutch; for example, the clutch may be engaged as the throttle is being opened in starting the vehicle on a smooth pavement or on level ground. Then again it is desirable to appreciably open the throttle to speed up the motor and increase its torque output before engaging the clutch under the following conditions: when the vehicle is mired in soft ground; if the vehicle is positioned on an up grade; after a free wheeling operation when the driven clutch plate is rotating at a high speed; in shifting down, for example to change from high to intermediate gear during the operation of the vehicle. Lastly, it may be desirable to engage the clutch before opening the throttle, as for example when operating the change-speed transmission from a low to a high gear ratio and at a time when the R. P. M. of the driving clutch plate, reflecting the engine speed, remains appreciably high due in the main to the inertia effect of the flywheel.

In any event, it is desirable, with the vehicle in motion, to effect an engagement of the clutch when the R. P. M.'s of the driving and driven clutch plates are equal or substantially equal and when starting the vehicle to engage the clutch so that the vehicle gets under way smoothly.

It is, therefore, an object of the invention to provide a mechanism, operable by the right foot of the driver, providing a power operation of the clutch and a manual operation of the throttle, the two being selectively independent of each other and yet so possible of coordination as to accurately simulate the corresponding right and left foot manual operation of both the throttle and clutch.

A further object of the invention relates to the provision of clutch operating power means so constructed as to provide an irregular engaging movement of the driving clutch element as it moves toward the driven clutch element, the first stage of movement being relatively fast to bring the clutch plates into clutch engaging position; the second stage of movement of the driving element being relatively slow, either to effectively slip the clutch into engagement in starting the vehicle, or to reduce the shock in engaging the clutch elements with the car in motion and the elements rotating at the same or approximately the same R. P. M., or to reduce the surge or excessive acceleration or deceleration of the vehicle during engagement of the clutch elements, if perchance said elements are rotating at substantially different speeds; and a third stage of movement being relatively fast to complete the firm engagement of the clutch elements and prevent unnecessary slipping of the clutch under extreme loads.

It is to be particularly noted that the means for providing the aforementioned irregular engagement of the clutch effectively cooperates with the aforementioned means for selectively operating the throttle and control valve; however, said means may be used with equal or more effectiveness with the construction suggested in the aforementioned patent to Belcia wherein both the throttle and control valve are jointly operated by the accelerator pedal.

Yet another object of the invention is to provide power means for controlling the operation of the clutch so constructed that the mode of engagement of the clutch is controlled by friction means forming a part of the motor of said power means, the mode of operation of the friction means being dependent both upon the particular construction of the elements thereof and the relative position of said elements with respect to each other as the driving clutch element is moved into engagement with the driven element.

A further object of the invention is to provide friction means, operable during the engagement of the clutch, to control said engagement and automatically rendered inoperative when the clutch is being disengaged.

Other objects of the invention, including the provision of a control valve cast with a portion of the intake manifold of the engine between the carburetor throttle and engine pistons, and including details of the aforementioned friction means wherein the piston of the clutch motor functions as the friction means, and further including other details of construction and combinations of elements, will all be apparent from the following detailed description of certain preferred embodiments of the invention illustrated in the accompanying drawings, in which:

Figure 4 is a sectional view disclosing the details of the several control valves for the clutch operating motor and also disclosing the throttle valve for controlling the engine;

Figure 2:
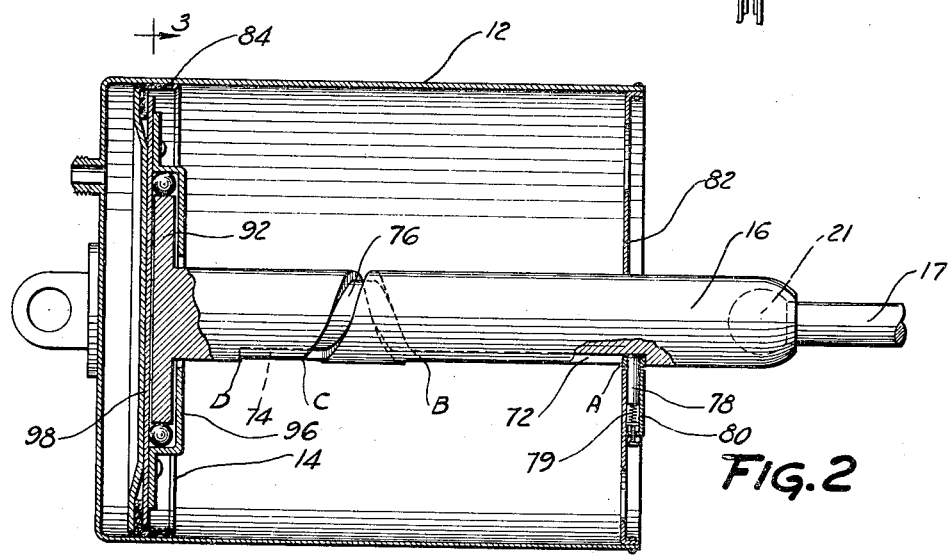
Figure 2 is a sectional view of the vacuum operated motor constituting the principal element of the invention.

Figure 5 discloses, in side elevation, the foot operated treadle for operating the throttle and control valve;

Figure 6 discloses in greater detail the treadle member and connections thereto, the view being taken looking in the direction of the arrows 6—6 of Figure 5; and Figure 7 is a view similar to that of Figure 2 disclosing a modified form of clutch operating motor.

Figure 1:
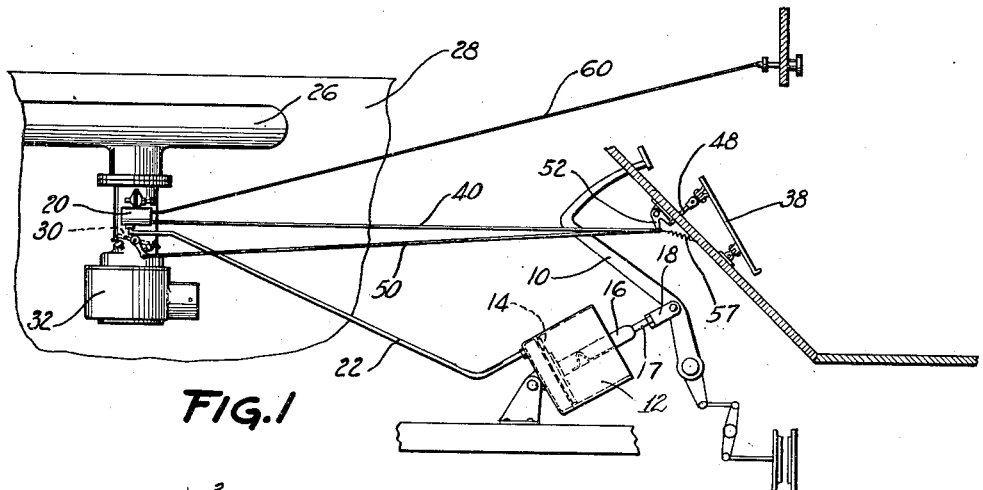
Figure 1 is a diagrammatic view disclosing the elements of the clutch and throttle control mechanism constituting the invention.

Referring now to Figure 1 of the drawings diagrammatical disclosing the essential elements of the invention, there is provided a conventional clutch operating pedal 10, shown in full lines in its clutch disengaged position. The pedal is rendered operable to control the clutch by vacuum operated power means comprising a cylinder 12, pivotally secured to a fixed portion of the vehicle, and a reciprocable piston 14 therein connected with the clutch pedal by a connecting rod 16 and a link 17, the latter being adjustable as to length by means of a threaded end portion fitting within a socket member 18. The link 17 is universally connected to the rod 16 by a ball joint 21.

The cylinder and piston together constitute a vacuum operated clutch operating motor. One end of the cylinder 12 is connected to a three-way control valve 20 by a conduit 22, the control valve comprising a casing 24 preferably cast integrally with an intake manifold 26 of an internal-combustion engine 28 between a butterfly or throttle valve 30 of a carburetor 32 and the engine pistons. The throttle valve is provided with the usual stops 33 and 33' for determining the range of movement of the throttle. The control valve further comprises a spool-shaped piston 34, recessed at 35 and operably connected to one side 36 of a heart-shaped, foot-operated treadle member 38 by linkage comprising rods 40 and 42 interconnected by a bell crank 44, said rods being pivotally connected to the treadle and throttle valve. The other side 46 of the treadle 38 is preferably connected, by rods 48 and 50 and a connecting bell crank 52, to the throttle valve 30 of the carburetor, and a lower portion 51 of the treadle is preferably universally connected at 54 to a floorboard portion 56 of the driving compartment of the vehicle. The throttle and valve linkages are operated to return the same to the off position of the parts by means of springs 57 and 57' acting on the bell cranks 52 and 44, respectively. It will be obvious, therefore, that with the construction shown that the throttle 30 and valve 20 may be operated independently of each other or may be operated successively or concurrently at the will of the driver.

With the treadle in its fully released position, as disclosed in full lines in Figures 1 and 5, the throttle valve is closed and the valve piston 34 is positioned, as disclosed in Figure 4, to intercommunicate the closed end of the cylinder 12 with the manifold via conduit 22, the recess 35 in the spool-shaped piston, a cut-off valve 58 and a check valve 61, the latter valves to be described in greater detail hereinafter. The piston 34 is further provided with a slot 62 adapted, with the side of the treadle 38 connected to link 40 depressed, to move the piston to the left to vent the suction compartment of the cylinder 12 to atmosphere via the conduit 22, slot 62 and openings 64 in the end wall of the valve casting. The clutch may also be held in a partially engaged or disengaged position by lapping the valve, that is moving the same to a position such that a portion 63 completely covers the opening to the conduit 22.

The aforementioned structure is, in a general way, similar to that disclosed in the aforementioned patent to Belcia, No. 1,470,272, the three-way control valve serving to render the clutch motor operative to disengage the clutch and subsequently inoperative to permit an engagement thereof. The motor may also be controlled to either partially engage or disengage the clutch by lapping the valve as above described. Explaining the operation of the source of power in greater detail, there is created at closed throttle a vacuum of some twenty inches of mercury in the manifold of the engine. When the manifold is placed in communication with the cylinder, as above explained, the latter is evacuated, thus energizing the clutch motor and disengaging the clutch; this operation is effected when the throttle and valve operating treadle are released. When the treadle is operated to move the valve piston 34 to the left to register the slot 62 with the conduit 22, the cylinder is vented, as above explained, thus permitting the clutch to be engaged by the clutch spring (not shown).

The aforementioned cut-off valve is similar in structure to the control valve 20 and comprises a piston 58' recessed at 59 and 59' to connect the valve 20 with the source of vacuum and with the atmosphere, respectively, the piston being operable from the dash of the vehicle by a connection 60. When it is desired to render the clutch motor inoperative; for example, when it is desired to use the engine as a brake in descending a grade, the cut-off piston 58' is moved to the left, Figure 4, thus venting the clutch motor to the atmosphere and permitting the clutch to engage under the action of its spring.

A pressure regulating check valve 61 is also incorporated in the connection between the manifold and the control valve, said check valve including a two-part casing, a part 69 being connected to a conduit 73 extending into the body of the manifold 26 and a part 71 being connected with a conduit 65 also extending into the manifold. A diaphragm 66 is normally pressed by a spring 67 against a standpipe or projection 68 extending from the conduit 73. A conduit 70 interconnects the check valve with the cut-off valve.

In operation, when the accelerator is moved to its released position, the diaphragm 66 is moved to the right, Figure 4, by virtue of the pressure differential established in the valve, thus intercommunicating conduit 73 with conduit 70 and effecting a disengagement of the clutch. The spring 67 aided by the existing differential of pressure maintains the diaphragm seated when the throttle is opened without opening the control valve 20; thus the clutch is maintained disengaged until the control valve 20 is operated to engage the clutch irrespective of the reduction of the vacuum of the manifold with the opening of the throttle.

The construction of the treadle and connections thereto permitting the aforementioned selective operation of the throttle and control valve constitutes an important feature of my invention, inasmuch as it is desirable, when the vehicle is in motion, to bring the R. P. M. of the driving clutch element up to equal or at least closely approximate that of the driven clutch element before the control valve is operated to permit an engagement of the clutch. With the suggested construction, if the driver wishes to speed up the engine driven member of the clutch, he rocks his foot to depress the left side of the treadle, thereby opening the throttle to the desired extent, depending upon the speed of the vehicle and the existing gear ratio selection of the change speed transmission. When the driver believes the engine has been speeded up sufficiently he then maintains the throttle setting and rocks his foot to the right, pivoting about the left side of the instep, to thus operate the clutch motor to permit an engagement of the driving and driven elements of the clutch. When the throttle is opened the vacuum of the engine manifold is automatically reduced, however the presence of the check valve 61 obviates a clutch engaging operation of the clutch motor until the control valve 20 is operated as explained above.

If desired, the throttle may be operated to the exclusion of the power mechanism, and the clutch pedal manually operated in the usual fashion. It is also to be noted that during a quick shifting operation of the transmission that the inertia of the flywheel keeps the R. P. M. of the driving clutch plate relatively high in which event the control valve 20 should be operated to engage the clutch while the throttle remains completely closed.

In starting the vehicle from rest, for example on a level pavement, the throttle is usually opened to only a very limited extent before the control valve is operated to engage the clutch. However, should the vehicle be positioned on an up grade or mired in sand or mud, it would be necessary to open the throttle to a far greater extent before operating the control valve to engage the clutch. The driven clutch plate is then static, and it is necessary to slowly engage the clutch without, however, causing an undue amount of slipping of the plates.

It is with respect to this latter operation of the clutch control mechanism that a very important feature of the invention is directed, and this portion of the construction will now be described in detail.

It is desirable to simulate the conventional manual operation of the clutch pedal, and to this end the clutch operating mechanism is constructed to first permit a relatively rapid movement of the clutch pedal under the action of the conventional clutch spring. When the plates are about to engage, means are provided to appreciably retard the movement of the driving clutch element to provide a smooth initial clutch engagement, and after the elements are rotating together in driving engagement the movement of the clutch pedal is speeded up to effect a final engagement of the clutch.

To the above end the piston connecting rod 16 is provided with a groove, Figure 2, preferably straight at its ends at 72 and 74 and of helical path at 76 intermediate said end portions. One end of a guide pin 78, housed within a retainer 80 secured to the end wall 82 of the cylinder 12, extends into the aforementioned groove and functions together with the groove to determine the mode of movement of the piston as it reciprocates within the motor cylinder. The ball and socket connection 21 permits the piston to revolve.

The piston is disclosed, in Figure 2, in its clutch disengaged position at the left of the cylinder. With operation of the control valve 20 to permit the clutch to engage, the piston first moves bodily to the right under the action of the clutch spring, the movement being solely one of translation. During this movement, which is relatively rapid to take up the slack between the clutch elements, the pin 78 traverses the straight slot 72 from point A to point B, Figure 2; from point B to point C the pin traverses the helical portion 76 of the slot, thereby imparting a combined translatory and rotary movement to the piston. The rotation of the piston serves to immediately slow up its translatory movement by virtue of increased frictional resistance between a conventional cup washer member 84 on the piston and the inner wall of the cylinder, thus slowly easing the clutch elements into driving engagement, one with another.

In starting the vehicle this slow movement is absolutely necessary in order to provide for slippage to obviate a grabbing clutch or the stalling of the engine which might otherwise ensue should the engagement be too rapid. The relatively low torque of both the slow moving engine and the then existing low geared transmission is to be considered in operating the clutch in starting the vehicle in motion. With the vehicle in motion and the R. P. M.'s of the clutch elements equal or approximately so, as previously described, this slow movement of the clutch elements reduces the impact of the elements to a minimum. It is not desirable, however, to unduly delay the completion of the engagement of the clutch, for this results both in excessive wear of the plates due to the slipping action and in an undesired increase in R. P. M. of the driving clutch plate over that of the driven plate before the plates rotate as a unit. To obviate this result the movement of the driving plate is speeded up after the completion of the aforementioned slow movement by moving the pin 78 from point C to point D in the slot, Figure 2. This portion of the slot is straight, thus insuring a relatively rapid completion of the engagement of the clutch elements, the elements being firmly compressed into driving engagement by the final action of the clutch spring. The connection 18 permits an adjustment so that point B in the slot corresponds to a point in the clutch throw at which the clutch elements are about to engage, and the variable or constant pitch of the helical slot 76 may be determined to effect the desired variation in the movement of the elements during the second or clutch contacting stage. The friction between the washer 84 and the cylinder wall, and the friction between the end of the pin 78 and its slot may also be varied to change the timing of the clutch engaging operation. This adjustment of frictional effect may be obtained by varying the depth of the slot in the rod 16 and also by the tension of a spring 79 acting on the pin 78.

A minor but nevertheless important feature of the invention resides in the provision of a one-way clutch of ratchet structure 86, in the body of the pistion 14. As disclosed, this ratchet structure comprises spring pressed balls 88 housed within recesses 90 in a flanged end 92 of the rod 16, the balls wedging between cammed surfaces 94 and the inner wall of a flanged housing member 96 attached to a body portion 98 of the piston member. The above described one-way clutch or ratchet structure permits relative movement between the piston 98 and piston rod 16, when the rod 16 is rotating during the disengaging movement of the piston without retarding the movements of the connected parts, and prevents relative movement between these parts, to obtain the desired frictional drag and retardation, when the clutch is being engaged. The movement of the piston is thus impeded by the frictional means in one direction of movement only, as is desired.

Figure 3:
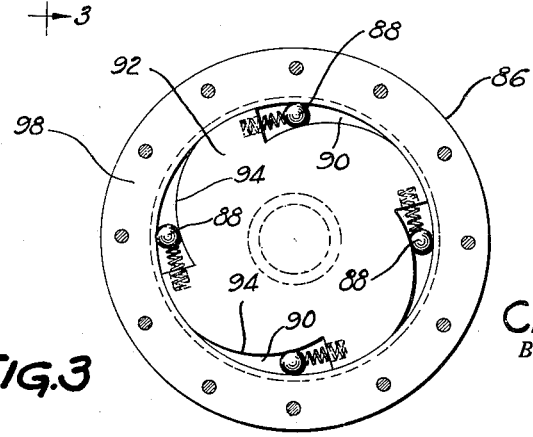
Figure 3 is a view taken on the line 3—3 of Figure 2 disclosing the details of the overrunning clutch incorporated as part of the motor piston structure.

There is disclosed in Figure 7 a modified form of frictional means for determining the mode of clutch engagement. Here there is provided a disk brake structure for slowing up the clutch engagement. The structure in its primary details is similar to that of the modification of Figure 2, a cylinder 100 housing a reciprocable piston 102, a piston rod 104 being slotted at 106 to cooperate with a pin 108, all as previously described. The disk brake structure constituting the essence of this modified form comprises a flange 110, on one end of the piston rod 104, said flange serving as a rotor friction element cooperating with a stator or non-rotatable member 112 secured to a flanged end 114 of an adjustable rod 116, the latter pivotally but non-rotatably secured at its other end to the clutch pedal, not shown. The non-rotatable friction element comprises a two-part housing 118 secured to the flanged end 114 by a one-way clutch structure 120 similar to that disclosed in Figures 2 and 3. The friction means of the brake comprises a friction mat 122 secured to a plate 124, the latter secured to the housing 118, said friction means further comprises a plate 126 provided with a friction mat 128, said plate being pressed by compression springs 130 into engagement with the flange 110. The springs 130 are normally compressed between the plate 126 and housing 118 and function to force the two apart, thereby exerting a pressure of one friction element on the other. The compression of the springs 130 may be increased by the adjustment of nuts 132 to thus force the brake parts into greater or less frictional contact, one with another, and automatically compensate for wear of the friction elements.

The lengthwise adjusting means of the rod 116, not shown, also functions to determine the relative position of the parts in a manner similar to the modification disclosed in Figure 2.

In operation, the rod 104 is rotated during the clutch disengaging movement of the piston 102: however, this rotation does not affect the body portion of the piston by virtue of a swivel joint between the piston body and a flange 134 on one end of the rod 104. This swivel joint comprises, in addition to the flange 134, a cap 136 housing the flange 134 and secured to the body of the piston. The one-way clutch 120 avoids the operation of the disk brake structure during the disengagement of the clutch, the brake parts moving as a unit.

With engagement of the clutch, however, there is effected a relative movement between the rods 104 and 116, the former being rotated under the action of the cooperating helical portion of groove 106 and pin 108. This relative movement brings the disk brake 112 into operation to retard the translatory movement of the piston 102 as the clutch elements are engaging. The disk brake thus serves the same function as the rotating piston in the modification of Figure 2.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. In an automotive vehicle provided with an internal-combustion engine and a clutch, the latter comprising driving and driven elements, power means for operating the clutch, including means providing for an irregular engagement of the clutch, the clutch contacting phase of the engagement providing a relatively slow movement of the driven clutch element, a throttle for controlling the operation of the internal-combustion engine, a control valve for said power means, and a common manually operable means conveniently operated by the right foot of the driver, for either successively or concurrently operating the throttle and the control valve to thereby provide means for regulating the R. P. M. of the driving clutch plate in relation to the time and mode of operation of the control valve.

2. Power means for operating the clutch of an automotive vehicle having an internal-combustion engine, said means comprising a cylinder and a piston, the two together constituting a fluid operated motor, a fluid transmitting connection interconnecting said motor with the intake manifold of said engine, a control valve for said motor incorporated in said fluid transmitting connection, said motor piston and its associated parts being constructed to control the engagement of the clutch by making of said piston a friction member operative to slow up the clutch engagement during a portion of the movement of the piston.

3. In an automotive vehicle provided with a clutch, a pressure differential operated motor operative to effect a disengagement of the clutch and subsequently permit an engagement of the same, said motor comprising a cylinder and a piston, the latter provided with a connecting rod operatively connected with the clutch to be operated, and means for rotating said piston during a portion of its clutch engaging throw to thereby retard the movement of the piston by virtue of its frictional contact with the inner cylindrical wall of the cylinder.

4. In an automotive vehicle provided with a clutch, a pressure differential operated motor operative to effect a disengagement of the clutch and subsequently permit an engagement of the same, said motor comprising a cylinder and a piston, the latter provided with a connecting rod operatively connected with the clutch to be operated, and means for rotating said piston during a portion of its clutch engaging throw to thereby retard the movement of the piston by virtue of its frictional contact with the inner cylindrical wall of the cylinder, said means comprising a helical slot in the connecting rod, and a pin fixedly secured in one end wall of the cylinder and housed at its end within said slot.

5. In an automotive vehicle provided with a clutch, a pressure differential operated motor operative to effect a disengagement of the clutch and subsequently permit an engagement of the same, said motor comprising a cylinder and a piston, the latter provided with a connecting rod operatively connected with the clutch to be operated, and means for rotating said piston during a portion of its clutch engaging throw to thereby retard the movement of the piston by virtue of its frictional contact with the inner cylindrical wall of the cylinder, said means comprising a helical slot in the connecting rod, and a pin fixedly secured in one end wall of the cylinder and housed at its end within said slot, and further comprising a one-way clutch member housed within the body of the piston to insure the operation of said friction means in one direction only.

6. In an automotive vehicle provided with a clutch comprising driving and driven elements, a pressure differential operated motor operatively connected with the clutch for disengaging the same and permitting an engagement of the clutch under the action of its spring, said motor comprising a cylinder and a piston, and further comprising friction means inoperative during the operation of the motor to disengage the clutch and automatically rendered operative during the engagement of the clutch to predetermine the mode of clutch engagement to provide for a relatively slow movement of the driving element of the clutch as it moves into engagement with the driven element.

7. In an automotive vehicle provided with a clutch comprising driving and driven elements, a pressure differential operated motor operatively connected with the clutch for disengaging the same and permitting an engagement of the clutch under the action of its spring, said motor comprising a cylinder and a piston, the latter comprising friction means inoperative during the operation of the motor to disengage the clutch and automatically rendered operative during the engagement of the clutch to predetermine the mode of clutch engagement to provide for a relatively slow movement of the driving element of the clutch as it moves into engagement with the driven element, said friction means comprising an overrunning clutch housed within the body of the piston to provide for the operation of said friction means in one direction only.

8. In an automotive vehicle provided with a clutch, means for releasing said clutch, power means for operating said clutch, said power means comprising a cylinder and a piston, and means, interconnecting said piston and clutch releasing means, including friction means comprising relatively movable parts, one part of said friction means being connected to said clutch releasing means and the other part of said friction means being connected to said piston.

9. In an automotive vehicle provided with a clutch, means for releasing said clutch, power means for operating said clutch, said power means comprising a cylinder and a piston, and means, interconnecting said piston and clutch releasing means, comprising a disk brake friction means, the stator element of said disk brake being connected to said clutch releasing means and the rotor element of said disk brake being connected to said piston.

10. An automotive vehicle provided with a clutch, a clutch pedal operably connected with the clutch, power means for releasing the clutch comprising a cylinder and a piston, and means, interconnecting the pedal and piston, comprising a piston rod universally connected to the piston at one end and provided at its other end with friction means, said interconnecting means further comprising a connection secured at one of its ends to said pedal and provided at its other end with friction means adapted to cooperate with said first mentioned friction means to provide means for determining the mode of engagement of the clutch.

11. An automotive vehicle provided with a clutch, a pedal operatively connected with the clutch, power means for releasing the clutch comprising a cylinder and a piston, and means, interconnecting the pedal and piston, comprising a piston rod universally connected to the piston at one end and provided at its other end with friction means, said interconnecting means further comprising a connection secured at one of its ends to said pedal and provided at its other end with friction means adapted to cooperate with said first mentioned friction means, and means for rotating said piston rod during the operation of said power means comprising a helical groove in said rod, and pin means secured to one end of said cylinder and adapted to fit within said groove.

12. In an automotive vehicle provided with a clutch, power means for operating said clutch, said means comprising a cylinder, a pressure differential operated piston within said cylinder, a control valve operative to initiate the clutch engaging and disengaging operations of said power means, means for operating said control valve, the said means further comprising a piston rod connected with the clutch, and means for rotating said piston and its rod during a portion of the clutch engaging throw of said piston, said latter means comprising a groove in the piston rod straight at its ends and of helical shape intermediate said straight ends, and a pin fixedly secured within one end wall of the cylinder and housed at its end within said groove, said power means further including a braking mechanism for controlling the clutch engaging operation thereof.

13. In an automotive vehicle provided with a clutch, power means for operating said clutch, said means comprising a cylinder and a pressure differential operated piston, and further comprising a piston rod connected with the clutch, and means for rotating said piston and its rod during a portion of the clutch engaging throw of said piston, said means comprising a groove in the piston rod straight at its ends and of helical shape intermediate said straight ends, and a pin fixedly secured within one end wall of the cylinder and housed at its end within said groove, together with means housed within the body of said piston for insuring rotation of said piston during one direction of movement only as it reciprocates within the cylinder, said last mentioned means comprising a one-way or overrunning clutch.

14. In a clutch control mechanism for an automotive vehicle provided with a throttle and a clutch, power means for operating the clutch, and a control valve for said power means, and common means for operating said throttle and valve comprising a foot operated treadle member, separate connections interconnecting said treadle with said throttle and valve, said connections being pivotally connected to said pedal, and means universally connecting said treadle with the floorboard of the driving compartment of the vehicle.

CALEB S. BRAGG.